Patented July 14, 1936

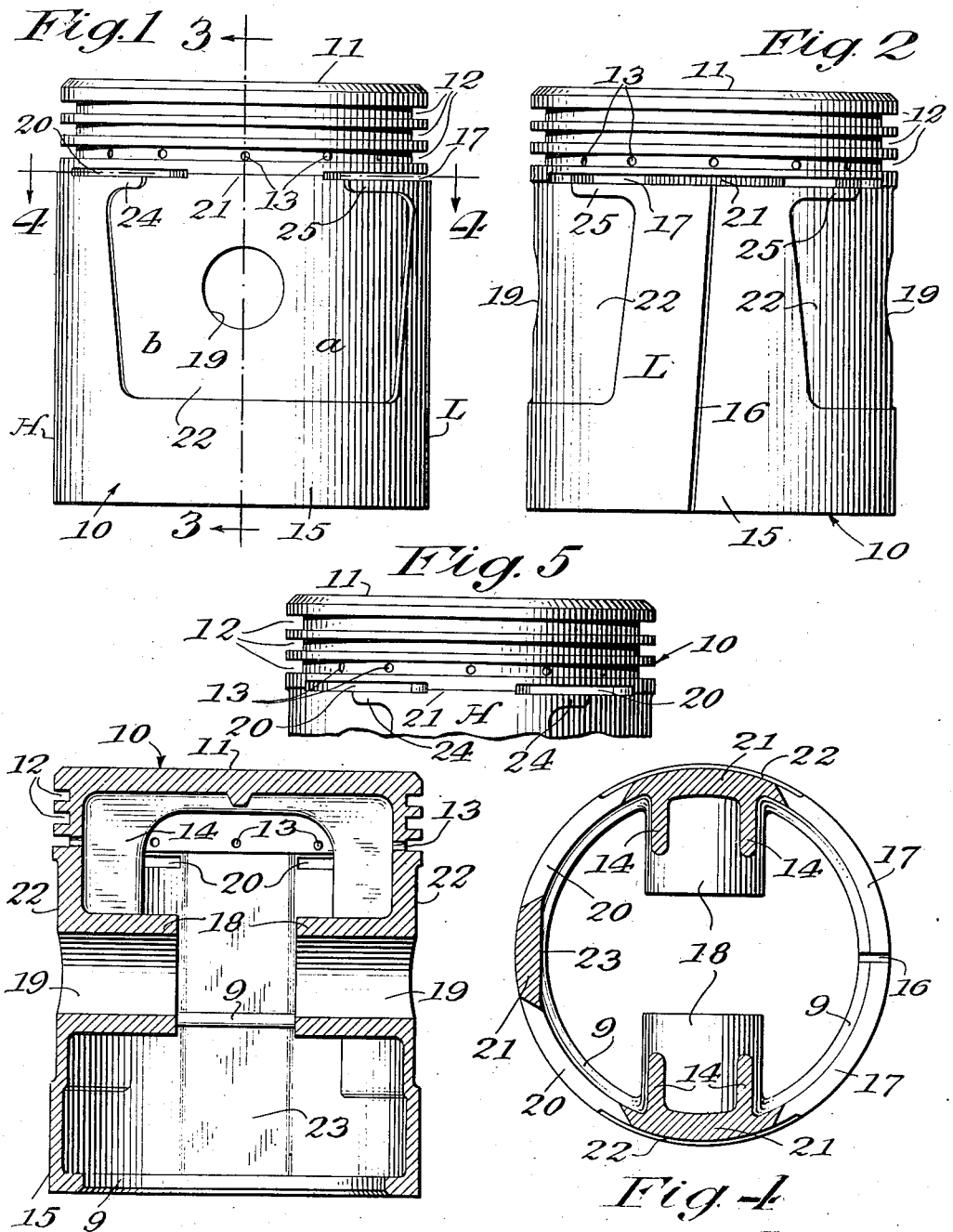

2,047,857

UNITED STATES PATENT OFFICE 2,047,857

PISTON

Ray E. Day, Detroit, Mich.

Application October 9, 1933, Serial No. 692,752

6 Claims. (Cl. 309—11)

This invention relates to pistons for internal combustion engines, and particularly to pistons made from aluminum alloy, which on account of the relatively high co-efficient of expansion of the metal, expand to such a degree under operating conditions as to require either an undesirable initial clearance within the cylinders, or the provision of means to control the expansion so that a substantially uniform clearance may be maintained during operation.

The present application is a continuation in part of my co-pending application, Serial No. 623,064, filed July 18, 1932.

I have found that there are two principal factors which control the successful manufacture and sale of a low price commercially practical piston. First, the design of the piston must be simplified in order to facilitate casting of the pistons and to reduce the cost of manufacture. Second, the piston must be so constructed in simplified manner as to take care of expansion and contraction under operating conditions, maintain a nearly uniform operating fit in the cylinder, and effectually guide the piston in order to prevent rocking or tilting of the piston and piston slap.

An object of the present invention is to provide a piston of simplified construction which can be produced cheaply and which at the same time is constructed in improved manner so as to have the desired high degree of efficiency in operation without resorting to structural expedients, many of questionable value, as heretofore.

Other objects of this invention will appear in the following description and appended claims, reference being had to the accompanying drawing forming a part of this specification wherein like reference characters designate corresponding parts in the several views.

In said drawing:

Fig. 1 is an elevational view of a piston made in accordance with my invention.

Fig. 2 is an elevational view of the low thrust side or face of the piston of Fig. 1.

Fig. 3 is a vertical section taken substantially along the line 3—3 of Fig. 1.

Fig. 4 is a horizontal section taken substantially along the line 4—4 of Fig. 1.

Fig. 5 is a fragmentary elevation of the high thrust side of the piston of Fig. 1.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now particularly to the drawing, my improved piston is shown as a whole at 10, and comprises a head portion 11, provided with piston ring grooves 12, the lowermost groove having a series of oil escape holes or openings 13 formed therein. The head 11 is internally reenforced by a pair of ribs 14. The piston skirt is shown at 15 and has a low thrust face or side L and a high thrust face or side H. The low thrust side of the skirt is provided with an upright slot 16 which extends from the bottom of the skirt and intercepts a horizontal slot 17. The slot 17 serves to separate the head and skirt on the low thrust side. The skirt carries a pair of piston pin bosses or bearings 18 having the usual piston pin openings 19. The skirt is reenforced internally by ribs 9.

Referring to Fig. 5, it will be seen that the high thrust face or side H of the piston skirt is separated from the head at two points by a pair of spaced horizontal slots 20. At points between the ends of the slots 17 and 20, the head and skirt are connected together as one integral part, as shown at 21, two such connections being located above the piston pin bosses 18 and the other connection on the high thrust side or face of the piston, midway between the bosses (see Figs. 2 and 4). Thus it will be seen that there are three points of connection between the head and the skirt. The upright slot 16 and the horizontal slots 17 and 20 may be formed by milling cutters, in which case the complete piston is formed in the mold and the several parts later separated by the application of the cutter to form the aforesaid slots. However, the slots may be preformed during the molding operation.

The skirt is provided on opposite sides with relieved areas 22, located at points surrounding the piston pin openings 19, each of said relieved areas comprising portions $a$ and $b$. The portion $a$ toward the low thrust side of the piston is of greater area than the portion $b$ toward the high thrust side or face, thus providing a piston which has a greater effective bearing surface on the high thrust side than on the low thrust side. If desired, the piston wall may be made slightly thicker at the center of the high thrust side, as shown at 23, to reenforce that side of the piston.

It is particularly advantageous and desirable to prevent the piston from rocking within the cylinder during operation. To accomplish this, I have provided the skirt with relatively narrow bearing portions or strips 24 and 25 which are located at the upper edges of the relieved areas 22 and extend inwardly from the side edges of said areas toward the piston pin openings 19. It will be noted that the bearing portions 25 are slightly longer than the bearing portions 24, thus providing some additional bearing surface on the low thrust side of the piston.

During the operation of an engine, the excessive heat to which the head of the piston is subjected causes said head to expand in the direction of the piston pin bosses. The head and skirt being connected together, this expansion of the head has a tendency to expand the skirt in the same manner. By reason of the connection 21 between the head and the high thrust face H, the expansion of the head in the direction of the piston pin bosses 18 exerts an outward pull (in the direction of the bosses) on the middle of the high thrust face and causes a slight flattening of the face below the slots 20, thus preventing scuffing at the sides of the high thrust face. This not only preserves the piston but also prevents scoring of the cylinder wall.

In practice, the piston is placed in the engine cylinder in such a position that the reaction due to the compression will be directed against the relatively resilient or split side of the piston, while the reaction due to the explosion, which is much greater, will be directed against the side where the head and skirt are integral or continuous.

It will be seen that the widest portion of each unbalanced relieved area is on the compression or split side of the piston, whereas the smaller portion of the relieved area is on the explosion or high thrust side. Since the high thrust side of the piston is subjected to greater pressure than the low thrust side I have found it preferable to have a larger bearing surface on the high thrust side. By thus reducing the area of the bearing surface on the low thrust or compression side of the piston it will be seen that the flexibility of that side of the piston is increased to eliminate any possibility of binding of the piston.

With previous types of pistons having resilient skirt portions provided with open relieved areas, it has been found that there was a tendency of the piston to rock or tilt in the cylinder, causing the objectionable slapping of the piston. This is obviated in the present construction by the bearing strips or portions 24 and 25 located above the unbalanced relief areas. These bearing strips together with the bearing portions of the skirt below the relief areas 22, serve to guide the piston in the cylinder and also to prevent it from rocking. These bearing portions thus assist in guiding the piston at points between the skirt and the lower ring groove, but they are interrupted or relieved in the integral relieved areas through which the bosses are united to the head so as not to interfere with the outward movement of the bosses.

I claim:

1. A piston comprising a head, a skirt, and piston pin bosses, said skirt being vertically split at its low thrust side and separated at said side from the head by a circumferential slit, said piston having an unbalanced relieved area around each piston pin opening providing a wider portion on the split side than on the opposite side, and unbalanced bearing strips between the lower ring groove and each unbalanced relieved area spaced at opposite sides of the vertical center of the piston pin opening and providing a longer bearing strip above the wider portion of the unbalanced relieved area than above the narrower portion.

2. A piston comprising a head, a skirt, and piston pin bosses, said skirt being vertically split at its low thrust side and separated at said side from the head by a circumferential slit, said piston having an unbalanced relieved area around each piston pin opening providing a wider portion on the split side than on the opposite side, and unbalanced bearing strips between the lower ring groove and each unbalanced relieved area spaced at opposite sides of the vertical center of the piston pin opening and providing a shorter bearing strip above the narrower portion of the unbalanced relieved area than above the wider portion, said piston having unconnected circumferential slits separating said shorter bearing strips from the piston head.

3. A piston comprising a head, a skirt, and piston pin bosses, said skirt being vertically split at its low thrust side and separated at said side from the head by a circumferential slit, said piston having an unbalanced relieved area around each piston pin opening providing a wider portion on the split side than on the opposite side, and unbalanced bearing strips between the lower ring groove and each unbalanced relieved area spaced at opposite sides of the vertical center of the piston pin opening and providing a shorter bearing strip above the narrower portion of the unbalanced relieved area than above the wider portion, said piston having unconnected circumferential slits separating said shorter bearing strips from the piston head, said slits terminating short of said first named circumferential slit at the integral relieved area through which the head and piston pin bosses are united.

4. A piston comprising a head, a skirt, and piston pin openings, said skirt having an unbalanced relieved area around each piston pin opening providing a wider portion on one side of the opening than on the other side, and unbalanced bearing strips between the lower ring groove and each unbalanced relieved area spaced at opposite sides of the vertical center of the piston pin opening and providing a longer bearing strip above the wider portion of the unbalanced relieved area than above the narrower portion.

5. In a piston, the combination of a head having ring grooves therein, a skirt and piston pin bosses, said piston having an unbalanced relieved area around a piston pin opening providing a wider portion on one side of the opening than on the other side, and unbalanced bearing strips extending into the unbalanced relieved area adjacent the lower ring groove, the opposed ends of said bearing strips being spaced apart in the area immediately above the piston pin opening.

6. In a piston, the combination of a head having ring grooves therein, a skirt and piston pin bosses, said piston having an unbalanced relieved area around a piston pin opening providing a wider portion on one side of the opening than on the other side, unbalanced bearing strips projecting into the unbalanced relieved area in the vicinity of the lower ring groove, the free ends of said bearing strips being spaced apart in the area immediately above the piston pin opening and the longer of said bearing strips being immediately above the wider portion of said relieved area.

RAY E. DAY.